United States Patent

Wiederhöft et al.

[11] Patent Number: 5,094,834
[45] Date of Patent: Mar. 10, 1992

[54] PROCESS FOR THE PRODUCTION OF $TiO_2$ PIGMENTS

[75] Inventors: Gerhard Wiederhöft, Krefeld-Traar; Günter Lailach, Krefeld, both of Fed. Rep. of Germany

[73] Assignee: Bayer Aktiengesellschaft, Leverkusen, Fed. Rep. of Germany

[21] Appl. No.: 606,407

[22] Filed: Oct. 31, 1990

[30] Foreign Application Priority Data

Nov. 22, 1989 [DE] Fed. Rep. of Germany ....... 3938693

[51] Int. Cl.$^5$ .............................................. C01G 23/05
[52] U.S. Cl. ..................................... 423/616; 423/82; 423/85; 423/610; 423/615
[58] Field of Search .............. 423/82, 83, 85, 610, 423/615, 616, DIG. 2; 106/436

[56] References Cited

U.S. PATENT DOCUMENTS

| | | | |
|---|---|---|---|
| 2,479,637 | 8/1949 | Olson | 423/616 |
| 2,488,755 | 11/1949 | Aagaard et al. | 423/610 |
| 2,494,492 | 1/1950 | Ross et al. | 423/616 |
| 2,507,729 | 5/1950 | Myers | 423/616 |
| 3,862,297 | 1/1975 | Claridge et al. | 423/615 |
| 4,073,877 | 2/1978 | Klein | 423/616 |

FOREIGN PATENT DOCUMENTS 1110791 7/1961 Fed. Rep. of Germany.
1211348 2/1966 Fed. Rep. of Germany.

*Primary Examiner*—Wayne Langel
*Assistant Examiner*—Steven Bos
*Attorney, Agent, or Firm*—Sprung Horn Kramer & Woods

[57] ABSTRACT

In the production of $TiO_2$ pigments by the steps of digesting titanium-containing raw materials with sulfuric acid, hydrolyzing the titanyl sulfate obtained, separating the waste acid from the hydrolyzate, bleaching the hydrolyzate and calcining the hydrolyzate after addition of rutilizing nuclei and standardizing chemicals to form $TiO_2$ pigments, and recovering sulfuric acid from the waste acid, the improvement which comprises employing as the rutilizing nuclei nuclei produced from part of the bleached and then washed hydrolyzate, which nuclei are added to the remainder of the bleached and washed hydrolyzate before calcination.

6 Claims, No Drawings

PROCESS FOR THE PRODUCTION OF TIO$_2$ PIGMENTS

This invention relates to a process for the production of TiO$_2$ pigments comprising the steps of digesting titanium-containing raw materials with sulfuric acid, hydrolyzing the titanyl sulfate obtained, separating the waste acid from the hydrolyzate, bleaching the hydrolyzate and calcining the hydrolyzate after addition of rutilizing nuclei and standardizing chemicals to form TiO$_2$ pigments and recovering sulfuric acid from the waste acid.

It is known that nuclei which accelerate both hydrolysis and also rutile formation during calcination to TiO$_2$ pigments can be produced by converting washed hydrolyzate from the titanium dioxide production process into titanate and decomposing the titanate with monobasic acids, primarily HCl. The suspensions of nuclei thus produced are added during hydrolysis of the titanyl sulfate (DE-A 1 110 791, U.S. Pat. No. 2,479,637, U.S. Pat. No. 2,507,729).

It is also known that special rutilizing nuclei can be produced from washed hydrolyzate by conversion thereof into titanate and decomposition of the titanate with HCl and that the chloride-containing suspension may be mixed with the remaining hydrolyzate at any time before it is washed for the last time before calcination (U.S. Pat. No. 2,488,755, U.S. Pat. No. 2,494,492). In the processes just mentioned, the rutilizing nuclei may alternatively be added immediately before calcination providing the nucleus suspension has been washed free from chloride. On account of the extreme fineness of the rutilizing nuclei, this alternative is extremely complicated and is not normally worked on an industrial scale.

In addition, for ecological reasons, the waste acid accumulating during the titanium dioxide production process and the other dilute and contaminated sulfuric acid fractions associated with the production of TiO$_2$ are delivered to the sulfuric acid regenerating stage for recovery of the sulfuric acid. However, corrosion problems repeatedly arise in the recovery plant during the concentration of these contaminated sulfuric acids by evaporation.

Accordingly, the problem addressed by the present invention was to provide a process in which corrosion problems would no longer arise during recovery of the sulfuric acid without any adverse affect on the TiO$_2$ process or the quality of the TiO$_2$ pigments.

Surprisingly, this problem was solved by the process according to the invention.

The present invention relates to a process for the production of TiO$_2$ pigments comprising the steps of digesting titanium-containing raw materials with sulfuric acid, hydrolyzing the titanyl sulfate obtained, separating the waste acid from the hydrolyzate, bleaching the hydrolyzate and calcining the hydrolyzate after addition of rutilizing nuclei and standardizing chemicals to form TiO$_2$ pigments and recovering sulfuric acid from the waste acid, characterized in that the rutilizing nuclei are produced from part of the bleached and then washed hydrolyzate and are added to the remainder of the bleached and washed hydrolyzate before calcination.

The partial stream of the bleached and subsequently washed hydrolyzate, from which the rutilizing nuclei are produced, preferably makes up 1 to 10% by weight and, more preferably, 2 to 6% by weight of the total hydrolyzate.

It has surprisingly been found that the quality of the TiO$_2$ pigments produced by the process according to the invention (production of the rutilizing nuclei from hydrolyzate bleached and washed beforehand and addition of the nucleus suspension immediately before calcination) is distinctly improved in relation to the prior art. This is all the more surprising insofar as the total quantity of material subjected to calcination is bleached only once both in the prior art and in the process according to the invention. In addition, according to the prior art, part of the hydrolyzate is bleached after conversion into rutilizing nuclei so that any impurities entering the nucleus suspension during production of the nuclei are also separated off. Where the rutilizing nuclei are added in accordance with the invention after washing of the bleached hydrolyzate, any impurities from production of the rutilizing nuclei also enter the calcination furnace so that the quality of the pigments had actually been expected to deteriorate rather than improve.

The present invention also relates to TiO$_2$ pigments produced by the process according to the invention.

In one particular embodiment of the process according to the invention, the waste acid which accumulates during production of the TiO$_2$ and which is concentrated by evaporation to recover the sulfuric acid contains less than 2 g Cl$^-$/kg H$_2$SO$_4$ and preferably less than 1 g Cl$^-$/kg H$_2$SO$_4$.

In addition to the quality of the TiO$_2$ pigments, therefore, the quality of the waste acid accumulating during TiO$_2$ production is also improved, so that the problem of corrosion caused by an excessive chloride content in the waste acid in the recovery plant is alleviated or even avoided.

An improvement in pigment quality over the prior art is also obtained if the rutilizing nuclei produced in accordance with the invention are added before bleaching. Where this procedure is adopted, however, chloride ions (from the nucleus forming process) enter the sulfuric acid which was used during the reducing treatment of the hydrolyzate during bleaching. If this sulfuric acid is then concentrated by evaporation either together with or even separately from the waste acid, the above-mentioned corrosion problems attributable to the high chloride ion content arise during working up by this method. Accordingly, this variant of the process is only appropriate if this part of the sulfuric acid with the high chloride ion content is not worked up or if most of the chloride ions are removed.

The advantages of the process according to the invention are illustrated by the following examples.

EXAMPLE 1

(Comparison Example)

Titanium oxide hydrate (hereinafter referred to as hydrolyzate) precipitated by hydrolysis of titanyl sulfate was separated from the waste acid by filtration and washed (=filtration I). The hydrolyzate was then made into a pulp and bleached in dilute sulfuric acid by addition of Al powder. After bleaching, the material was refiltered and washed (=filtration II). The filtrate from filtration II, dilute sulfuric acid, was used as washing liquid in filtration I.

After filtration I, part of the hydrolyzate was removed and converted into rutilizing nuclei by reaction with alkali and subsequent decomposition of the titanate formed with hydrochloric acid.

300 l of the suspension of rutilizing nuclei, which contained 12.5 kg Cl$^-$ ions, were added per t TiO$_2$ during pulping of the hydrolyzate after filtration I. The rutilizing nuclei were bleached with the hydrolyzate, filtered and washed. After filtration II, standardizing chemicals were added to the nucleus-containing hydrolyzate which was then calcined. After grinding, after treatment and micronizing of the product obtained, the rutile pigment had the following quality (pure color as measured in accordance with DIN 55 983 and relative scattering power as measured in accordance with DIN ISO 787, Part 24):

Brightness in full shade: L*=93.4
Tint in full shade: S=2.5
Relative scattering power: P=112
Tint in gray paste: 7.4

The waste acid separated off in filtration I contained 25.2% by weight H$_2$SO$_4$ and 1880 ppm Cl$^-$, corresponding to 7.46 g Cl$^-$/kg H$_2$SO$_4$.

EXAMPLE 2

Hydrolysis and filtration I were carried out as in Example 1. To produce the rutilizing nuclei, however, bleached hydrolyzate was removed after filtration II and reacted as in Example 1 to form rutilizing nuclei. The Cl$^-$-containing suspension of rutilizing nuclei was added (in the same quantitative ratio as in Example 1) together with the standardizing chemicals after filtration II. Calcination and aftertreatment were carried out under the same conditions as in Example 1. The rutile pigment thus produced was of distinctly better quality than the pigment of Example 1 produced in accordance with the prior art:

Brightness in full shade: L*=94.1
Tint in full shade: S=2.2
Relative scattering power: P=112
Tint in gray paste: 7.5

The waste acid separated off in filtration I contained 25.1% by weight H$_2$SO$_4$ and 145 ppm Cl$^-$, corresponding to 0.58 g Cl$^-$/kg H$_2$SO$_4$.

It will be appreciated that the instant specification is set forth by way of illustration and not limitation, and that various modifications and changes may be made without departing from the spirit and scope of the present invention.

What is claimed is:

1. In the production of TiO$_2$ pigments by the steps of digesting titanium-containing raw materials with sulfuric acid, hydrolyzing the titanyl sulfate obtained, separating waste sulfuric acid from the hydrolyzate, bleaching the hydrolyzate, washing and calcining the hydrolyzate after addition of rutilizing nuclei to form TiO$_2$ pigments, and recovering sulfuric acid from the waste acid, the improvement which comprises providing nuclei produced from part of the bleached and then washed hydrolyzate as the rutilizing nuclei, which nuclei are added to the remainder of the bleached and washed hydrolyzate before calcination.

2. A process according to claim 1, wherein the rutilizing nuclei are produced from 1 to 10% by weight of the bleached and washed hydrolyzate.

3. A process according to claim 1, wherein the rutilizing nuclei are produced from 2 to 6% by weight of the bleached and washed hydrolyzate.

4. A process according to claim 1, wherein the waste acid which accumulates during production of the TiO$_2$ and which is worked up to recover the sulfuric acid contains less than 2 g Cl$^-$/kg H$_2$SO$_4$.

5. A process according to claim 1, wherein the waste acid which accumulates during production of the TiO$_2$ and which is worked up to recover the sulfuric acid contains less than 1 g Cl$^-$/kg H$_2$SO$_4$.

6. A process according to claim 3, wherein the waste acid which accumulates during production of the TiO$_2$ and which is worked up to recover the sulfuric acid contains less than 1 g Cl$^-$/kg H$_2$SO$_4$.

* * * * *